US011180283B1

(12) United States Patent
Schoof

(10) Patent No.: US 11,180,283 B1
(45) Date of Patent: Nov. 23, 2021

(54) LIFTING TOOL SUPPORT APPARATUS FOR AIR CARGO PALLETS

(71) Applicant: Michele Marie Schoof, Maricopa, AZ (US)

(72) Inventor: Michele Marie Schoof, Maricopa, AZ (US)

( * ) Notice: Subject to any disclaimer, the term of this patent is extended or adjusted under 35 U.S.C. 154(b) by 0 days.

(21) Appl. No.: 16/905,774

(22) Filed: Jun. 18, 2020

(51) Int. Cl.
*B65D 19/38* (2006.01)
*B64D 9/00* (2006.01)

(52) U.S. Cl.
CPC ............... *B65D 19/38* (2013.01); *B64D 9/00* (2013.01); *B65D 2519/00567* (2013.01); *B65D 2519/00791* (2013.01)

(58) Field of Classification Search
CPC ............ B64D 9/00; B65D 2519/00791; B65D 2519/0786; B65D 2519/00776; B62B 5/063; B62B 5/061; B62B 3/001; B62B 3/02; E21B 31/12; E21B 23/02; B25J 15/022
USPC ..................... 108/51.11; 280/304.5, 63, 28.5; 294/86.24, 86.28
See application file for complete search history.

(56) References Cited

U.S. PATENT DOCUMENTS

| | | | | |
|---|---|---|---|---|
| 1,102,065 A * | 6/1914 | Martin | ..................... | E21B 31/20 294/86.14 |
| 2,216,676 A * | 10/1940 | Ragland | .................. | E21B 31/12 294/86.24 |
| 2,459,207 A * | 1/1949 | Worthington | ...... | B65D 19/0073 294/67.4 |
| 2,594,908 A * | 4/1952 | Gaulke | ................. | E21B 11/005 294/86.14 |
| 2,789,859 A * | 4/1957 | Woellner | .................. | B66C 1/54 294/90 |
| 2,809,070 A * | 10/1957 | Nelson | ...................... | B66C 1/54 294/97 |
| 3,308,771 A * | 3/1967 | Wettlen | .................. | B65D 19/44 108/51.11 |
| 3,626,872 A * | 12/1971 | Cully | ................... | B65D 19/385 108/55.1 |
| 4,422,684 A * | 12/1983 | Zitzman | .................. | B66F 9/185 294/97 |
| 4,784,398 A * | 11/1988 | Lund | ........................ | B66C 1/54 279/2.16 |
| 5,284,098 A * | 2/1994 | Klapperich | ........ | B65D 19/0002 108/55.5 |
| 5,582,114 A * | 12/1996 | Feiner | ................ | B65D 19/0034 108/50.11 |
| 6,439,632 B1 | 8/2002 | Webber | | |

(Continued)

*Primary Examiner* — Jose V Chen
(74) *Attorney, Agent, or Firm* — Plager Schack LLP; Mark H. Plager; Kara Verryt

(57) ABSTRACT

A lifting tool support apparatus for use to lift an air cargo pallet is provided. The lifting tool support apparatus includes a main support plate, a key member coupled to the bottom end of the main support plate, and a pair of lock handles slidably mounted to the main support plate. Each lock handle has a lock plate designed to engage with the track on the air cargo pallet. The pair of lock handles slidably adjusts to a first position to permit the pair of lock plates to engage with the track, thereby locking the apparatus to the air cargo pallet. The pair of lock handles slidably adjusts to a second position to permit the pair of lock plates to disengage from the track, thereby unlocking the apparatus from the air cargo pallet.

9 Claims, 3 Drawing Sheets

(56) References Cited

U.S. PATENT DOCUMENTS

| | | | | |
|---|---|---|---|---|
| 7,491,024 | B2* | 2/2009 | Heinrichs | B65D 19/12 |
| | | | | 108/53.1 |
| 8,562,048 | B2* | 10/2013 | Cronian | B66C 1/66 |
| | | | | 294/97 |
| 9,242,381 | B2* | 1/2016 | Kramer | B25J 15/086 |
| 10,173,709 | B2 | 1/2019 | Zheng et al. | |
| 2005/0126330 | A1* | 6/2005 | Werder | B62B 5/06 |
| | | | | 74/523 |
| 2007/0215015 | A1* | 9/2007 | Heinrichs | B65D 19/06 |
| | | | | 108/53.1 |
| 2016/0122079 | A1* | 5/2016 | Doyle | B65D 19/44 |
| | | | | 108/55.3 |
| 2016/0152257 | A1* | 6/2016 | Choi | B62B 3/02 |
| | | | | 280/47.34 |
| 2018/0229749 | A1* | 8/2018 | Zheng | B62B 3/10 |
| 2019/0375545 | A1* | 12/2019 | Su | E05B 65/00 |
| 2021/0094598 | A1* | 4/2021 | Meiner | B62B 3/0625 |

\* cited by examiner

LIFTING TOOL SUPPORT APPARATUS FOR AIR CARGO PALLETS

BACKGROUND

The embodiments herein relate generally to cargo pallets used on aircraft. More specifically, embodiments of the invention are directed to a lifting tool support apparatus for air cargo pallets.

Aviation cargo is placed onto air cargo pallets that may be stacked for transportation. These air cargo pallets are very low to the ground, and when lifted by individuals may result in musculoskeletal injuries. Further, due to the weight and size of these cargo pallets, typically four individuals are necessary at the corners of the pallet to lift it up. This required collaboration among the individuals is inefficient and/or not possible under circumstances when there are not enough lifters present.

Several pallet lifting devices exist as disclosed in U.S. Pat. Nos. 10,173,709 and 6,439,632. However, these devices are limited in that they comprise complicated components that are difficult to assemble, maintain and/or operate.

As such, there is a need in the industry for a lifting tool apparatus for use with an air cargo pallet that addresses the limitations of the prior art, which allows users to lift the cargo pallets with enhanced safety, efficiency and comfort. There is a need for the lifting tool apparatus to have the ability to reduce the number of individuals required to lift the air cargo pallet. There is a need for the lifting tool apparatus to operate with any aircraft track pallet systems having air cargo pallets with L-tracks, angled L-tracks and recessed L-tracks.

SUMMARY

In certain embodiments of the invention, a lifting tool support apparatus for use to lift an air cargo pallet with enhanced efficiency and user safety is provided. The air cargo pallet comprises a track having an elongated opening formed between a pair of oppositely oriented edges wherein each edge in the pair of edges of the track comprises a plurality of teeth. The lifting tool support apparatus comprises a main support plate, a key member coupled to the bottom end of the main support plate and configured to pass through the elongated opening in the track of the air cargo pallet, and a pair of lock handles slidably mounted to the main support plate, each lock handle in the pair of lock handles comprising a lock plate configured to engage with the plurality of teeth on one of the pair of edges of the track on the air cargo pallet, wherein the pair of lock handles is configured to slidably adjust to a first position to permit the pair of lock plates to engage with the oppositely oriented edges of the track, thereby locking the apparatus to the air cargo pallet, wherein the pair of lock handles is configured to slidably adjust to a second position to permit the pair of lock plates to disengage from the oppositely oriented edges of the track, thereby unlocking the apparatus from the air cargo pallet.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

In certain embodiments of the invention as depicted in FIGS. 1-3 and 4A, lifting tool support apparatus 10 is configured for use by a user to lift air cargo pallet 50. Lifting tool support apparatus 10 is advantageous because it allows the user to lift air cargo pallet 50 with enhanced safety, efficiency and comfort. Furthermore, lifting tool support apparatus 10 reduces the number of users required to safely lift air cargo pallet 50.

In one embodiment, lifting tool support apparatus 10 is configured for use with any air cargo pallet 50 having track 32, which can be any aircraft track pallet system having air cargo pallets with L-tracks, angled L-tracks, recessed L-tracks or other tracks. In one embodiment, lifting tool support apparatus 10 is configured for use with International Air Transport Association (TATA) Unit Load Devices (ULD) with identification codes: PAG/PAJ, PMC, PQA, PBJ, PAH, PLA, PYB, PAX, PGA/PGF, PZA, PIA, PIC, PID, PIP, PIX, PAP, PAA, P1A, P1C, P1D and P1G.

Figure 3:
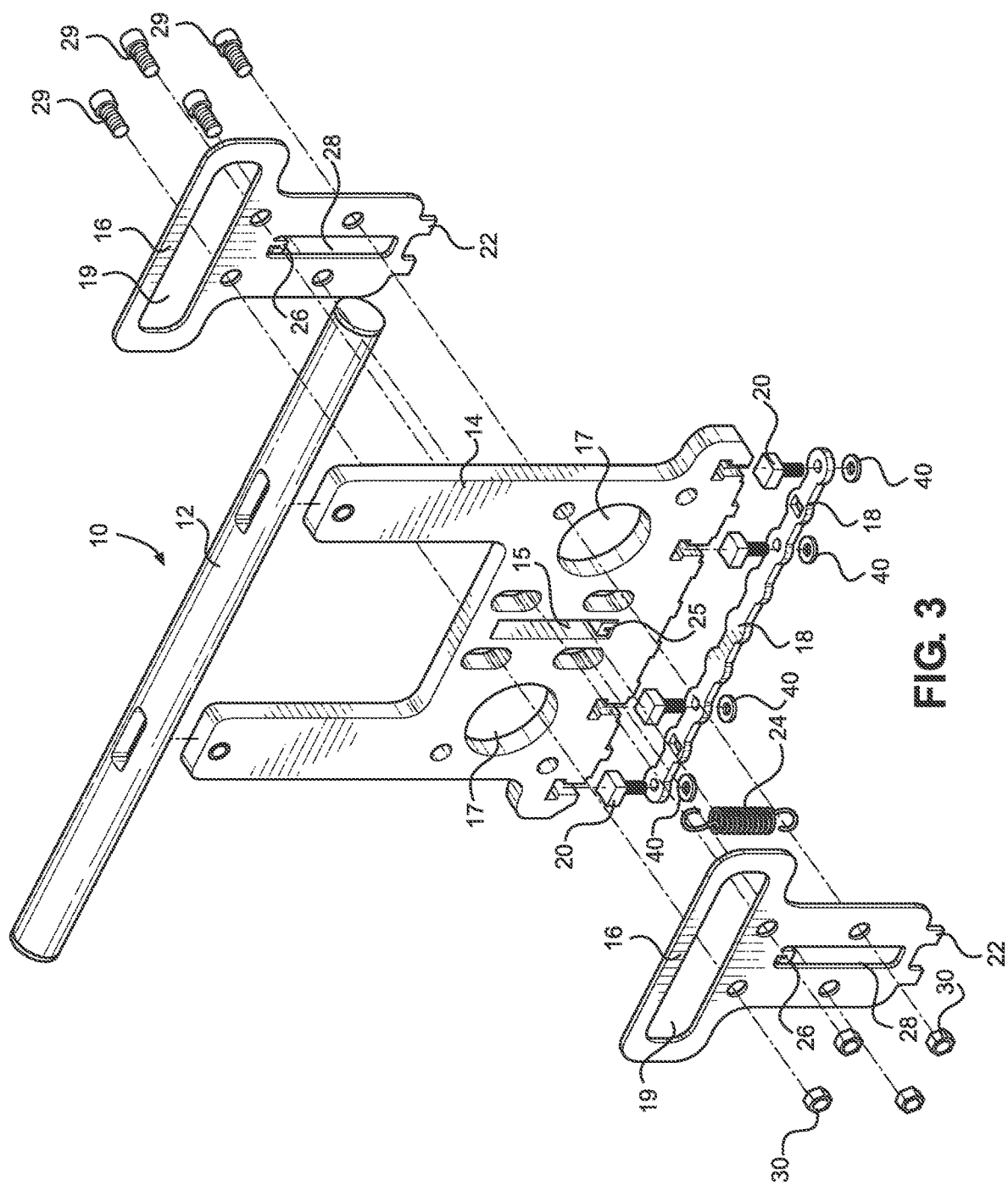
FIG. 3 depicts an exploded view of certain embodiments of the lifting tool support apparatus.

In one embodiment as depicted in FIG. 3, lifting tool support apparatus 10 generally comprises main handle 12, main support plate 14, a pair of lock handles 16 and key member 18. In one embodiment, these components of lifting tool support apparatus 10 are made from aluminum, stainless steel, other metals, alloys or other materials.

Figure 1:
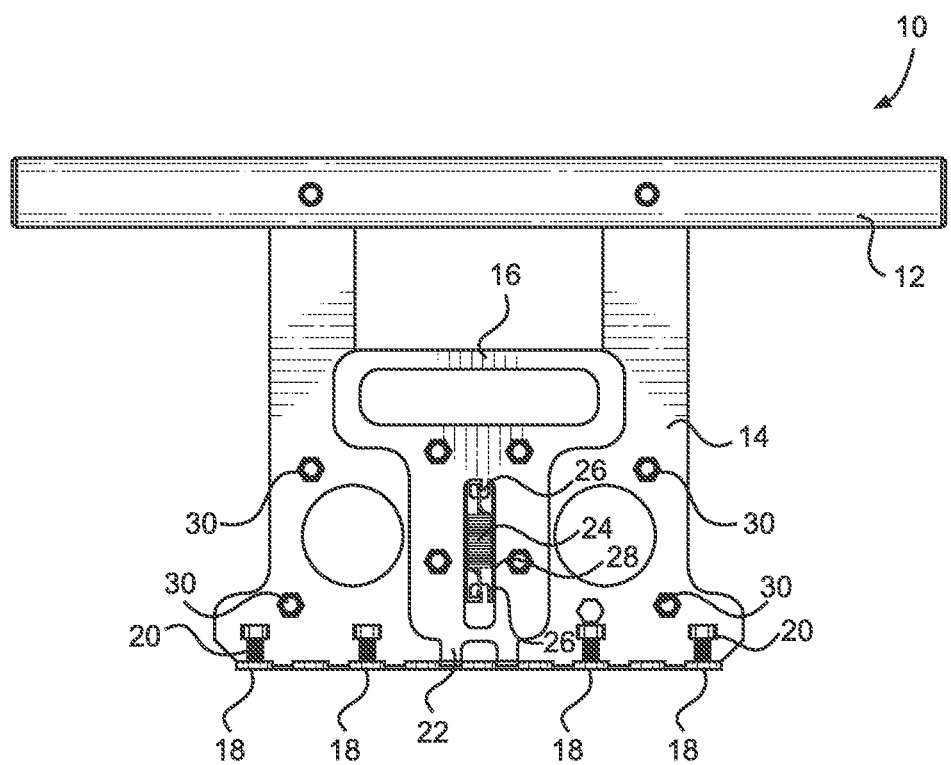
FIG. 1 depicts a front view of certain embodiments of the lifting tool support apparatus.
Figure 2:
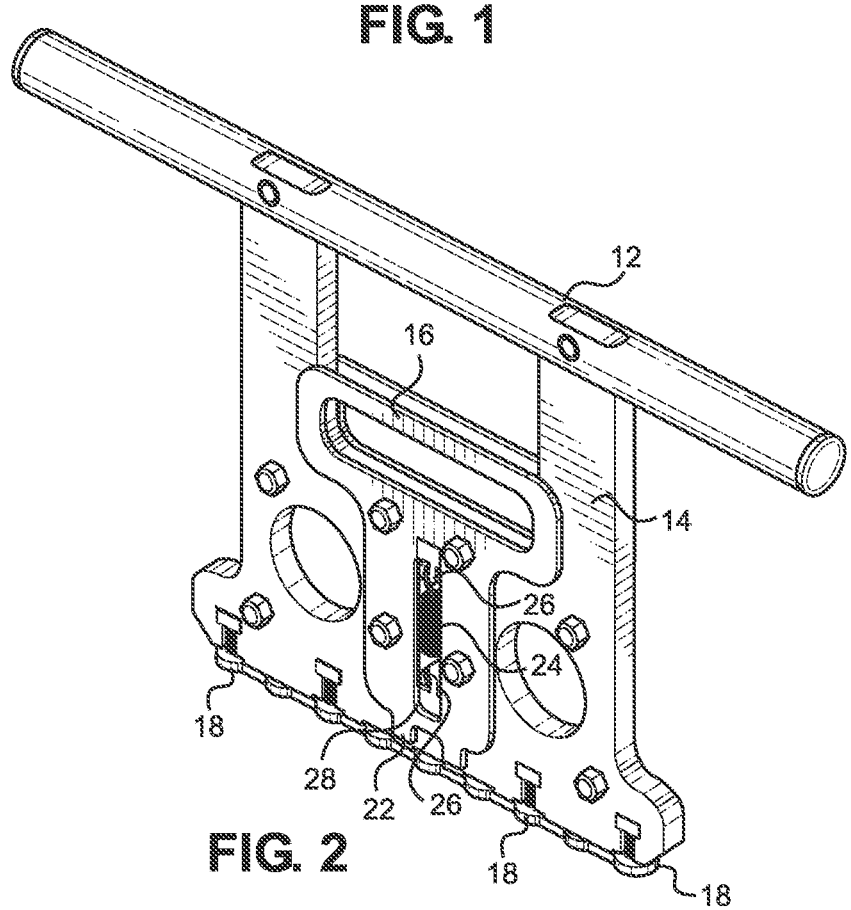
FIG. 2 depicts a perspective view of certain embodiments of the lifting tool support apparatus.

In one embodiment as depicted in FIGS. 1-3, main support plate 14 is approximately ⅜" thick and comprises central elongated slot 15 and a pair of cutouts 17. The dimensions of main support plate 14 can vary, but its height generally extends from the ground to the region between the knees and chest of the user. In one embodiment, key member 18 is coupled to the bottom of main support plate 14 by a plurality of socket screws 20 and washers 40. It shall be appreciated that any number of socket screws 20 and washers 40 can be used to secure key member 18 to main support plate 14. In an alternative embodiment, other fastening components can be used.

In one embodiment, it shall be appreciated that main support plate 14 can be made from a single sheet continuously connected to key member 18. In alternative embodiments, multiple components, e.g., sheets and key member 18 can be coupled together using any variety of fastening components.

In one embodiment as depicted in FIGS. 1-3, main handle 12 is coupled to the top of main support plate 14. More specifically, the top end of main support plate 14 comprises a pair of prongs that extend inside a corresponding pair of openings in main handle 12. Main handle 12 is coupled to main support plate 14 using any fastening components including, but not limited to, pin locks, screws, bolts or other fasteners. In one embodiment, main handle 12 comprises an elongated bar that serves as a surface for the user to grab when lifting air cargo pallet 50.

In one embodiment as depicted in FIG. 3, a pair of lock handles 16 is slidably mounted to opposing sides of main support plate 14. Each lock handle 16 comprises a plate with finger opening 19 on the top end, elongated slot 28 and a pair of teeth 22 on the bottom end. The pair of lock handles 16 is disposed on opposing sides of main support plate 14 so that elongated slots 28 of lock handles 16 align with central elongated slot 15 of main support plate 14. In this position, screws 29 insert through the pair of lock handles 16 and main support plate 14, and are secured in place by nuts 30. The size of the fastener openings in main support plate 14 allow screws 29 to slide up and down therein. This allows the pair of lock handles 16 to slide up and down relative to main support plate 14.

In one embodiment as depicted in FIG. 3, each lock handle 16 is also connected to main support plate 14 by spring 24. In one embodiment, spring 24 is a steel extension spring with looped ends. However, other types of springs can be used.

In one embodiment, spring 24 comprises a first end coupled to upper hook 26 located on the top face of elongated slot 28 of lock handle 16 and a second end coupled to lower hook 25 on a bottom face of central elongated slot 15 on main support plate 14. In this configuration, a pair of springs 24 connect lock handles 16 to main support plate 14, which allows lock handles 16 to slidably adjust up and down relative to main support plate 14.

In certain embodiments as depicted in FIGS. 4A-4D, the operation of lifting tool support apparatus 10 with air cargo pallet 50 is illustrated. In one embodiment, track 32 of air cargo pallet 50 is part of an aircraft track pallet system having a L-track, angled L-track, recessed L-track or the like. In one embodiment, track 32 comprises elongated track opening 34, which is formed by a pair of oppositely oriented edges 36. Each edge 36 of track 32 comprises a plurality of teeth 38 that are configured to engage with teeth 22 of lock handles 16.

Figures 4A, 4B:
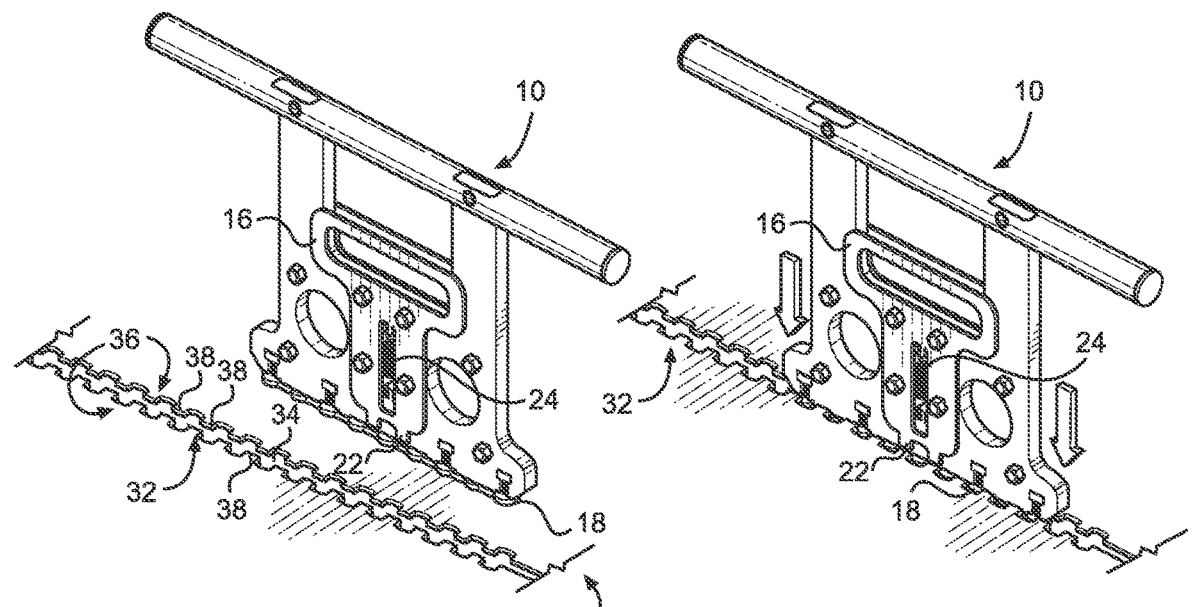
FIG. 4A depicts a perspective view of certain embodiments of the lifting tool support apparatus illustrating the alignment of the apparatus with track 32 of the air cargo pallet.
FIG. 4B depicts a perspective view of certain embodiments of the lifting tool support apparatus illustrating the insertion of the apparatus into track 32 of the air cargo pallet.

In one embodiment as depicted in FIG. 4A, a user grabs main handle 12 and aligns lifting tool support apparatus 10 with track 32 on air cargo pallet 50. In this alignment, key member 18 on main support plate 14 is aligned with elongated track opening 34 in air cargo pallet 50. In one embodiment as depicted in FIG. 4B, the user lowers lifting tool support apparatus 10 as shown by the arrows so that key member 18 passes through elongated track opening 34 to a position beneath track 32.

Figures 4C, 4D:
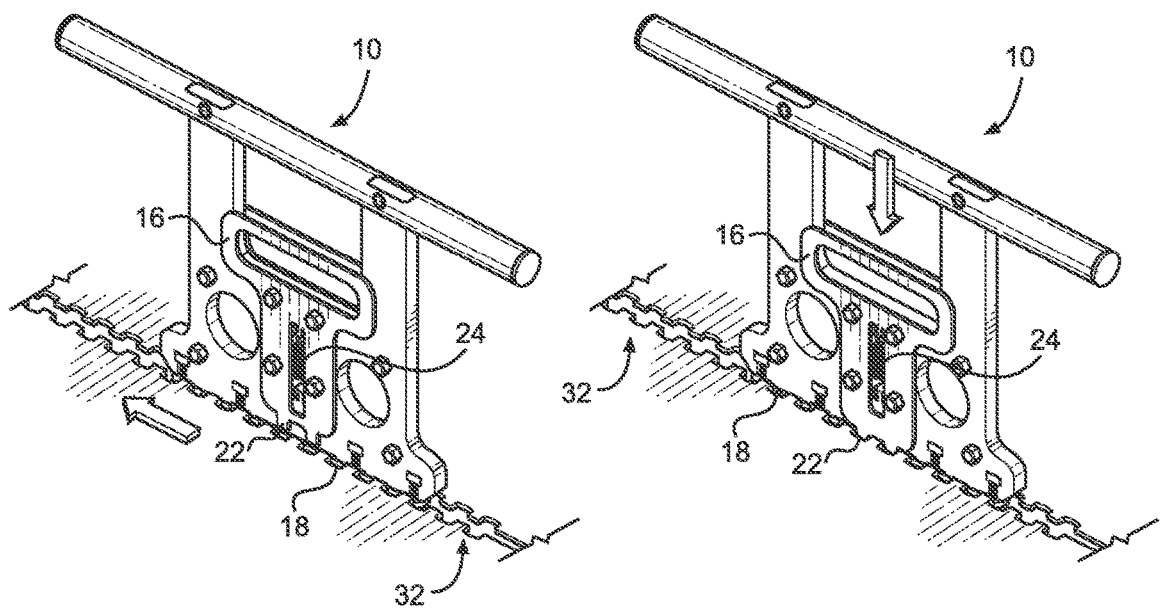
FIG. 4C depicts a perspective view of certain embodiments of the lifting tool support apparatus illustrating the lateral movement of the apparatus on track 32 of the air cargo pallet.
FIG. 4D depicts a perspective view of certain embodiments of the lifting tool support apparatus illustrating the engagement of the apparatus with track 32 of the air cargo pallet.

In one embodiment as depicted in FIG. 4C, the user slides lifting tool support apparatus 10 laterally relative to air cargo pallet 50 until teeth 22 of the pair of locking handles 16 automatically engage with any corresponding teeth 38 on track 32. During this engagement as depicted in FIG. 4D, the pair of lock handles 16 slide down relative to main support plate 14 to a position with teeth 22 engaged with teeth 38 on both edges 36 of track 32. It shall be appreciated that the lateral movement of lifting tool support apparatus 10 can be in the opposite direction of the arrow in FIG. 4C to facilitate the engagement of lock handles 16 with track 32.

In this engaged position in FIG. 4D, lifting tool support apparatus 10 is locked to track 32 of air cargo pallet 50. The user grabs main handle 12 of lifting tool support apparatus 10 to lift air cargo pallet 50 as desired.

To unlock lifting tool support apparatus 10 from track 32 of air cargo pallet 50, the user inserts his/her fingers through finger openings 19 in lock handles 16 and pulls up on lock handles 16. This upward movement disengages teeth 22 of lock handles 16 from teeth 38 on track 32 of air cargo pallet 50. The user slides lifting tool support apparatus 10 laterally relative to air cargo pallet 50 to align key member 18 with elongated track opening 34 of track 32. Once aligned, the user lifts main handle 12 to detach lifting tool support apparatus 10 from air cargo pallet 50.

As shall be apparent, lifting tool support apparatus 10 is advantageous because it provides a device that allows a user to quickly and safely lift air cargo pallets in a manner that reduces injuries. Furthermore, lifting tool support apparatus 10 is easy-to-operate and attaches and detaches from track 32 of air cargo pallet 50 with minimal effort. Finally, lifting tool support apparatus 10 reduces the number of individuals required to lift air cargo pallet 50. In one embodiment, two users can safely lift air cargo pallet 50 by engaging his/her own lifting tool support apparatus 10 to one of the pair of tracks 32 commonly found on these air cargo pallets. Together, these two users grab main handles 12 of the lifting tool support apparatuses 10 to lift air cargo pallet 50 as needed.

It shall be appreciated that the components of the lifting tool support apparatus described in several embodiments herein may comprise any alternative known materials in the field and be of any color, size and/or dimensions. It shall be appreciated that the components of the lifting tool support apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A lifting tool support apparatus for use to lift an air cargo pallet with enhanced efficiency and user safety, the air cargo pallet comprising a track having an elongated opening formed between a pair of oppositely oriented edges, each edge in the pair of edges of the track comprising a plurality of teeth, the lifting tool support apparatus comprising:
   a main support plate comprising a top end, a bottom end opposite the top end, and a pair of side ends connecting the top and bottom ends together;
   a key member coupled to the bottom end of the main support plate and configured to pass through the elongated opening in the track of the air cargo pallet; and
   a pair of lock handles slidably mounted to the main support plate, each lock handle in the pair of lock handles comprising at least one tooth configured to engage with the plurality of teeth on one of the pair of edges of the track on the air cargo pallet;
   wherein:
   the pair of lock handles are slidably adjustable in an orthogonal direction with respect to a length of the key member from a first position to a second position;
   when the pair of lock handles are in the first position, the at least one tooth is configured to engage with the track to prevent the lifting tool from moving laterally with respect to track, thus preventing the key member from being able to pass through the elongated opening in the track of the air cargo pallet;

when the pair of lock handles are in the second position, the at least one tooth is configured to disengage from the track, allowing the lifting tool to move laterally with respect to the track; and the at least one tooth is offset from protrusions on edges of the key member.

2. The lifting tool support apparatus of claim 1, wherein the pair of lock handles is slidably mounted to the main support plate by a pair of springs, each spring in the pair of springs connecting one of the lock handles in the pair of lock handles to the main support plate.

3. The lifting tool support apparatus of claim 2, wherein the main support plate comprises a central elongated slot, the central elongated slot in the main support plate comprising a top face and a bottom face having a lower hook coupled thereto.

4. The lifting tool support apparatus of claim 3, wherein the lock plate in each lock handle in the pair of lock handles comprises an elongated slot aligned with the central elongated slot of the main support plate, the elongated slot in the lock plate comprising a top face having an upper hook and a bottom face.

5. The lifting tool support apparatus of claim 4, wherein each spring in the pair of springs comprises a first end coupled to the upper hook on one of the pair of lock handles and a second end coupled to the lower hook on the main support plate.

6. The lifting tool support apparatus of claim 5, further comprising a main handle coupled to the top end of the main support plate.

7. The lifting tool support apparatus of claim 6, wherein the main handle comprises an elongated bar.

8. A method for lifting an air cargo pallet with enhanced efficiency and user safety, the air cargo pallet comprising a track having an elongated opening formed between a pair of oppositely oriented edges, each edge in the pair of edges of the track comprising a plurality of teeth, the method comprising:

providing a lifting tool apparatus, the lifting tool apparatus comprising:

a main support plate comprising a top end, a bottom end opposite the top end, and a pair of side ends connecting the top and bottom ends together;

a key member coupled to the bottom end of the main support plate; and a pair of lock handles slidably mounted to the main support plate, each lock handle in the pair of lock handles comprising at least one tooth configured to engage with the plurality of teeth of one of the pair of edges of the track on the air cargo pallet, wherein:

the pair of lock handles are slidably adjustable in an orthogonal direction with respect to a length of the key member from a first position to a second position;

when the pair of lock handles are in the first position, the at least one tooth is configured to engage with the track to prevent the lifting tool from moving laterally with respect to track, thus preventing the key member from being able to pass through the elongated opening in the track of the air cargo pallet;

when the pair of lock handles are in the second position, the at least one tooth is configured to disengage from the track, allowing the lifting tool to move laterally with respect to the track; and the at least one tooth is offset from protrusions on edges of the key member;

aligning the key member with the elongated opening of the track on the air cargo pallet;

maneuvering the lifting tool apparatus to insert the key member through the elongated opening of the track on the air cargo pallet; and sliding the main support plate laterally relative to the air cargo pallet to permit the pair of lock handles to engage with the oppositely oriented edges of the track, thereby locking the apparatus to the air cargo pallet.

9. The method of claim 8, further comprising lifting the pair of lock handles and sliding the main support plate laterally relative to the air cargo pallet to permit the pair of lock handles to disengage from the oppositely oriented edges of the track, thereby unlocking the apparatus from the air cargo pallet.

* * * * *